US011373327B2

(12) United States Patent
Morinaga et al.

(10) Patent No.: US 11,373,327 B2
(45) Date of Patent: Jun. 28, 2022

(54) IMAGE PROCESSING DEVICE AND METHOD THAT DETERMINE A STOP POSITION IN A PARKING FRAME USING IMAGES FROM TWO CAMERAS

(71) Applicant: DENSO TEN Limited, Kobe (JP)

(72) Inventors: Hiroki Morinaga, Kobe (JP); Tetsuo Yamamoto, Kobe (JP); Hiroaki Sano, Kobe (JP); Akihiko Shiotani, Kobe (JP)

(73) Assignee: DENSO TEN Limited, Kobe (JP)

( * ) Notice: Subject to any disclaimer, the term of this patent is extended or adjusted under 35 U.S.C. 154(b) by 349 days.

(21) Appl. No.: 16/705,294

(22) Filed: Dec. 6, 2019

(65) Prior Publication Data
US 2020/0311961 A1    Oct. 1, 2020

(30) Foreign Application Priority Data

Mar. 29, 2019   (JP) .............................. JP2019-068921

(51) Int. Cl.
*B60R 11/04*   (2006.01)
*G06T 7/70*   (2017.01)
*G06T 7/10*   (2017.01)

(52) U.S. Cl.
CPC .............. *G06T 7/70* (2017.01); *B60R 11/04* (2013.01); *G06T 7/10* (2017.01); *B60R 2300/105* (2013.01); *B60R 2300/806* (2013.01); *G06T 2207/30264* (2013.01)

(58) Field of Classification Search
None
See application file for complete search history.

(56) References Cited

U.S. PATENT DOCUMENTS

| 2004/0119610 | A1* | 6/2004 | Maemura | B62D 15/028 |
| | | | | 340/932.2 |
| 2010/0066515 | A1* | 3/2010 | Shimazaki | G06T 7/73 |
| | | | | 340/435 |
| 2018/0122245 | A1* | 5/2018 | Penilla | B60L 50/66 |
| 2020/0369262 | A1* | 11/2020 | Suzuki | B60R 21/00 |

FOREIGN PATENT DOCUMENTS

JP           2017-087758 A      5/2017

* cited by examiner

*Primary Examiner* — Idowu O Osifade
(74) *Attorney, Agent, or Firm* — Oliff PLC

(57) ABSTRACT

An image processing device includes: a first generation unit which generates first target parking frame information based on an image taken by a first shooting unit that is provided at a side position of a vehicle; a second generation unit which generates second target parking frame information based on an image taken by a second shooting unit that is provided at a front or rear position of the vehicle; and a determination unit which determines a stop position in a parking frame by generating third target parking frame information to serve as a stop target based on the first target parking frame information generated by the first generation unit and the second target parking frame information generated by the second generation unit.

14 Claims, 6 Drawing Sheets

IMAGE PROCESSING DEVICE AND METHOD THAT DETERMINE A STOP POSITION IN A PARKING FRAME USING IMAGES FROM TWO CAMERAS

CROSS-REFERENCE TO RELATED APPLICATIONS

This application is based on and claims priority under 35 USC 119 from Japanese Patent Application No. 2019-068921 filed on Mar. 29, 2019.

TECHNICAL FIELD

The present invention relates to an image processing device and an image processing method.

BACKGROUND ART

In recent years, with the development of autonomous drive technologies, image processing devices have been coming into wide use that detect a parking frame in which to park a vehicle from an image taken by shooting surroundings of the vehicle. In image processing devices of this type, partition lines that define parking frames are detected from an image taken and a target parking frame is detected on the basis of the detected partition lines (refer to JP-A-2017-87758, for example).

SUMMARY OF INVENTION

Incidentally, a vehicle may be equipped with plural shooting units such as side cameras and a rear camera. In such a case, since a parking frame is detected on the basis of each of images taken by the plural shooting units, plural detection results representing the parking frame are obtained. Conventionally, an autonomous parking control is performed by selecting one of the plural detection results and calculating a target parking position in the parking frame on the basis of the selected detection result.

However, there may occur an event that switching is made from a shooting unit that has been used to calculate a target parking position to another shooting unit due to a change in the parking environment such as the distance to the parking frame. When switching is made between shooting units, the target parking position may be changed suddenly to a large extent due to differences in performance between the shooting units involved, the position of the other shooting unit, and other factors. Since a sudden change in the target parking position is prone to cause an unstable behavior of the vehicle in the autonomous parking control, it is desired to provide a technique for preventing a sudden change of a target parking position.

The present invention has been made in view of the above and an object of the present invention is therefore to provide an image processing device and an image processing method capable of preventing a sudden change of a target parking position.

The invention provides an image processing device characterized by comprising a first generation unit, a second generation unit, and a determination unit. The first generation unit generates first target parking frame information on the basis of an image taken by a first shooting unit that is installed at a side position of a vehicle. The second generation unit generates second target parking frame information on the basis of an image taken by a second shooting unit that is installed at a front or rear position of the vehicle. The determination unit determines a stop position in a parking frame by generating third target parking frame information to serve as a stop target on the basis of the first target parking frame information generated by the first generation unit and the second target parking frame information generated by the second generation unit.

The invention makes it possible to prevent a sudden change of a target parking position.

DETAILED DESCRIPTION OF THE INVENTION

An image processing device 1 and an image processing method according to an embodiment of the present invention will be hereinafter described in detail with reference to the accompanying drawings. The invention is not restricted by the following embodiment.

Figure 1:
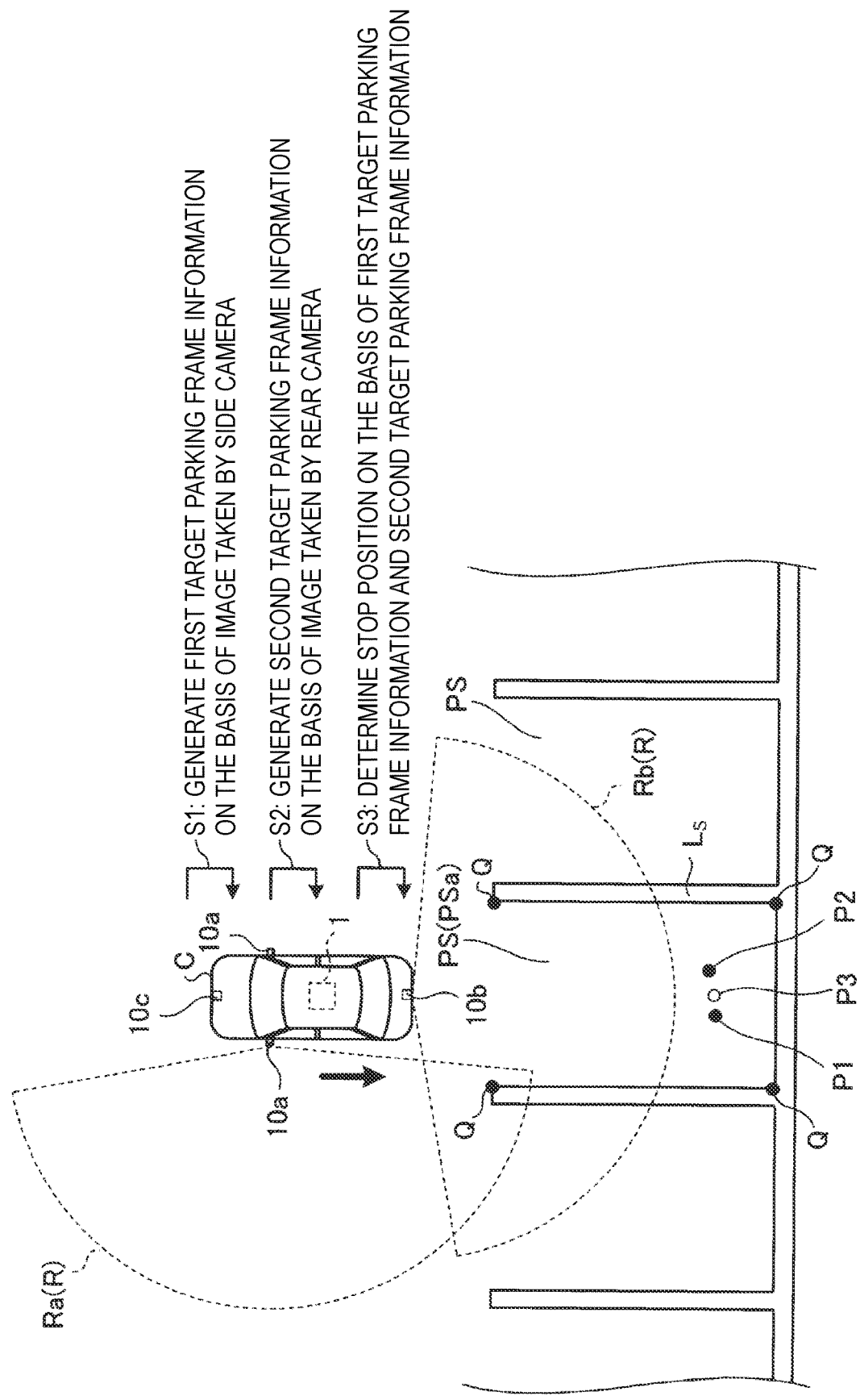
FIG. 1 is a diagram outlining an image processing method according to an embodiment.

First, the image processing method according to the embodiment will be outlined with reference to FIG. 1. FIG. 1 is a diagram outlining the image processing method according to the embodiment. A case that the image processing device 1 according to the embodiment determines a stop position in a parking frame by performing the image processing method according to the embodiment will be described with reference to FIG. 1.

As shown in FIG. 1, a vehicle C is equipped with plural cameras such as side cameras 10a, a rear camera 10b, and a front camera 10c. The side cameras 10a are cameras installed at side positions of the vehicle C and each of them is an example of a first shooting unit. The rear camera 10b is a camera installed at a rear position of the vehicle C and the front camera 10c is a camera installed at a front position of the vehicle C. Each of the rear camera 10b and the front camera 10c is an example of a second shooting unit.

Figure 2:
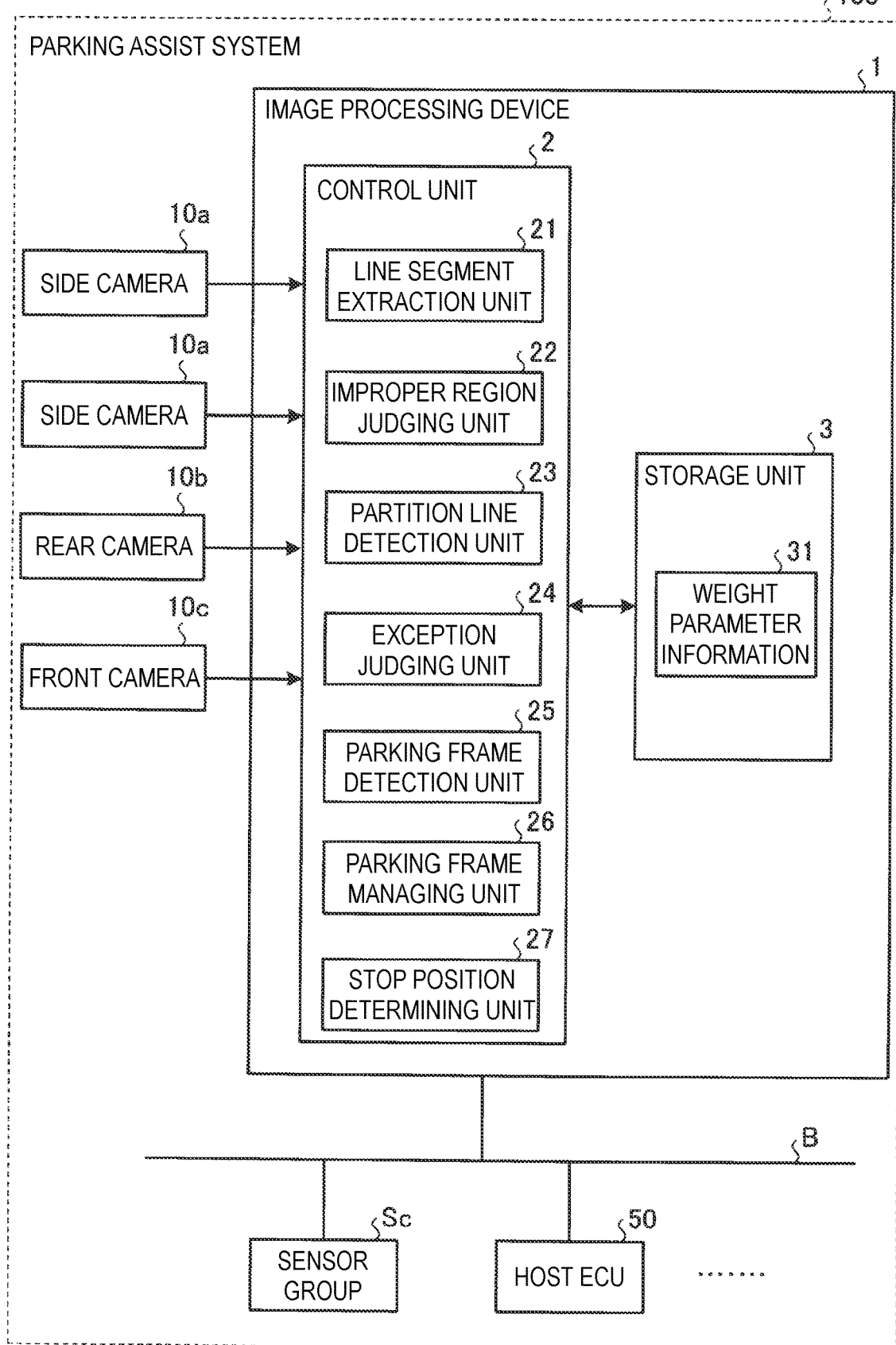
FIG. 2 is a block diagram of a parking assist system including a functional block diagram showing an example configuration of the image processing device according to the embodiment.

Each of the side cameras 10a, the rear camera 10b, and the front camera 10c is equipped with an imaging device such as a CCD (charge-coupled device) or a CMOS (complementary metal-oxide-semiconductor) sensor and shoots surroundings of the vehicle C. Each of the side cameras 10a, the rear camera 10b, and the front camera 10c employs a wide-angle lens such as a fisheye lens and has a shooting range R as shown in FIG. 2. To simplify FIG. 1, a shooting range Ra of the left side camera 10a and a shooting range Rb of the rear camera 10b are shown in FIG. 1.

The image processing device 1 according to the embodiment is installed in the vehicle C and performs the image processing method according to the embodiment. More specifically, first, the image processing device 1 according to the embodiment detects a parking frame PS on the basis of images taken by the side cameras 10*a*, the rear camera 10*b*, etc.

For example, the image processing device 1 extracts edge points whose edge intensities are larger than an edge threshold value from images (image data) taken by the side cameras 10*a*, the rear camera 10*b*, etc., detects partition lines Ls that define parking frames PS on the basis of the extracted edge points, and detects the parking frames PS on the basis of the detected partition lines Ls.

For example, to park the vehicle C autonomously, a target parking frame PSa is set from among the detected parking frames PS and a target parking position is calculated on the basis of the thus-set target parking frame PSa.

Incidentally, where the vehicle C is equipped with plural cameras such as the side cameras 10*a* and the rear camera 10*b*, two detection results, for example, a detection result indicating parking frames PS detected from an image taken by one of the side cameras 10*a* and a detection result indicating parking frames PS detected from an image taken by the rear camera 10*b* are obtained. Conventionally, an autonomous parking control is performed by selecting one of the two detection results and calculating a target parking position on the basis of the selected detection result.

However, there may occur an event that the camera that has been used to calculate a target parking position is switched, for example, from the rear camera 10*b* to the side camera 10*a* due to a change in the parking environment such as the distance from the vehicle C to the parking frame. When switching is made between the cameras, the target parking position may be changed suddenly to a large extent due to, for example, differences in performance between the cameras involved or the position of the side camera 10*a* to which the switching has been made. A sudden change in the target parking position is prone to cause an unstable behavior of the vehicle in the autonomous parking control.

In view of the above, the image processing device 1 according to the embodiment is configured so as to prevent a sudden change in a target parking position.

This will be described below in a specific manner. First, at step S1, first target parking frame information is generated on the basis of an image taken by one of the side cameras 10*a* (left side camera 10*a*). The first target parking frame information includes information relating to a target parking frame PSa that is obtained on the basis of the image taken by the one side camera 10*a*.

For example, the first target parking frame information includes information indicating a first target parking position P1 that is a target parking position in the target parking frame PSa detected from the image taken by the side camera 10*a*. Although in this example the first target parking position P1 is calculated on the basis of the target parking frame PSa detected from the image taken by the side camera 10*a* and other information such as a size of the vehicle C, the embodiment is not limited to this case.

The first target parking frame information may include information indicating end points Q of the target parking frame PSa detected from the image taken by the side camera 10*a* instead of or in addition to the first target parking position P1. It can be said that the end points Q are corner points of the target parking frame PSa. (A value(s) representing) the first target parking position P1 or the end points Q is a first prescribed value. The first prescribed value(s) is a reference value to be used for determining a target parking position. Where the end points Q are employed as the first prescribed values, a target parking position is determined with reference to the end points Q. It can be said that the first prescribed value(s) is information (position information such as coordinates information) relating to the target parking frame PSa detected on the basis of the image taken by the side camera 10*a* (first shooting unit).

At step S2, the image processing device 1 generates second target parking frame information on the basis of an image taken by the rear camera 10*b*. The second target parking frame information includes information relating to the target parking frame PSa that is obtained on the basis of the image taken by the rear camera 10*b*.

For example, the second target parking frame information includes information indicating a second target parking position P2 that is a target parking position in the target parking frame PSa detected from the image taken by the rear camera 10*b*. Although in this example the second target parking position P2 is calculated on the basis of the target parking frame PSa detected from the image taken by the rear camera 10*b* and other information such as a size of the vehicle C, the embodiment is not limited to this case. To facilitate understanding, FIG. 1 is drawn in such a manner that the first target parking position P1 and the second target parking position P2 are different positions and their distance is exaggerated.

The second target parking frame information may include information indicating end points Q of the target parking frame PSa detected from the image taken by the rear camera 10*b* instead of or in addition to the second target parking position P2. (A value(s) representing) the second target parking position P2 or the end points Q is a second prescribed value. Like the first prescribed value(s), the second prescribed value(s) is a reference value to be used for determining a target parking position. Where the end points Q are employed as the second prescribed values, a target parking position is determined with reference to the end points Q. It can be said that the second prescribed value(s) is information (position information such as coordinates information) relating to the target parking frame PSa detected on the basis of the image taken by the rear camera 10*b* (second shooting unit).

At step S3, the image processing device 1 generates third target parking frame information to serve as a stop target on the basis of the first target parking frame information (e.g., first target parking position P1) and the second target parking frame information (e.g., second target parking position P2) and determines a stop position in the target parking frame PSa.

For example, the third target parking frame information includes information indicating a third target parking position P3 that is a target stop position of the vehicle C to be subjected to an autonomous drive and is to be used for control of the autonomous drive.

As described above, in the image processing device 1 according to the embodiment, a stop position is determined by generating third target parking frame information to serve as a stop target on the basis of both of first target parking frame information generated on the basis of an image taken by one of the side cameras 10*a* and second target parking frame information generated on the basis of an image taken by the rear camera 10*b*.

A sudden change of a target parking position (in this example, third target parking position P3) of the vehicle C can be prevented by integrating the first target parking frame information and the second target parking frame information, which in turn makes it possible to stabilize the behavior of the vehicle C being subjected to an autonomous parking control. As a result, the driver can drive the vehicle C more comfortably.

The image processing device 1 may determine a stop position in the parking frame PS by generating third target parking frame information (in this example, third target parking position P3) by calculating, at step S3, a weighted sum of the first target parking position P1 included in the first target parking frame information and the second target parking position P2 included in the second target parking frame information.

With this measure, a target parking position (in this example, third target parking position P3) of the vehicle C can be calculated accurately while a sudden change of the target parking position is prevented. Weight parameters that are used in the weighted addition will be described later with reference to FIG. 3.

Next, an example configuration of the image processing device 1 according to the embodiment will be described with reference to FIG. 2. FIG. 2 is a block diagram of a parking assist system 100 including a functional block diagram showing an example configuration of the image processing device 1. As shown in FIG. 2, the parking assist system 100 is equipped with the image processing device 1, the vehicular cameras 10, a sensor group Sc, and a host ECU (electronic control unit) 50. As shown in FIG. 2, the image processing device 1, the sensor group Sc, and the host ECU 50 can communicate with each other via a communication bus B that complies with the CAN (Control Area Network) communication standard.

The sensor group Sc includes various sensors for detecting a running state of the vehicle C and communicates detected sensor values to the image processing device 1. The sensor group Sc includes a vehicle speed sensor for detecting a rotation speed of wheels of the vehicle C, a steering angle sensor for detecting a steering angle of the vehicle C, and other sensors.

The host ECU 50, which is, for example, an ECU for assisting parking of the vehicle C, causes the vehicle C to be parked in a parking frame PS detected by the image processing device 1. Being, for example, an EPS (electric power steering)-ECU for controlling the steering angle of the vehicle C, the host ECU 50 can control the steering angle so as to park the vehicle C in a parking frame PS detected by the image processing device 1. The host ECU 50 may include an ECU for performing acceleration control and braking control.

As shown in FIG. 2, the image processing device 1 is equipped with a control unit 2 and a storage unit 3. The control unit 2 is equipped with a line segment extraction unit 21, an improper region judging unit 22, a partition line detection unit 23, an exclusion judging unit 24, a parking frame detection unit 25, a parking frame managing unit 26, and a stop position determining unit 27.

For example, the control unit 2 includes various circuits and a computer having a CPU (central processing unit), a ROM (read-only memory), a RAM (random access memory), an HDD (hard disk drive), an input/output port, etc.

The CPU of the computer serves as the line segment extraction unit 21, the improper region judging unit 22, the partition line detection unit 23, the exception judging unit 24, the parking frame detection unit 25, the parking frame managing unit 26, and the stop position determining unit 27 of the control unit 2 by reading programs stored in the ROM and running them.

The line segment extraction unit 21, all of part of the improper region judging unit 22, the partition line detection unit 23, the exception judging unit 24, the parking frame detection unit 25, the parking frame managing unit 26, and the stop position determining unit 27 of the control unit 2 may be implemented by hardware such as an ASIC (application-specific integrated circuit) or an FPGA (field-programmable gate array).

The control unit 2 may execute a process of detecting a parking frame PS and a process of determining a stop position (described later) either only while the vehicle C is considered to be running in a parking lot (e.g., the vehicle speed is within 30 km/h) or all the time the vehicle C is running.

The line segment extraction unit 21 extracts edge points on the basis of the luminance of each of pixels of an image taken that is input from the vehicular camera 10a, 10b, 10c, or 10d. More specifically, the line segment extraction unit 21 converts image data received from the vehicular camera 10a, 10b, 10c, or 10d into a grayscale image (grayscaling). The grayscaling is processing of converting the value of each pixel of image data into one of prescribed gradation levels of white to black (e.g., 256 gradation levels) according to its luminance.

Then the line segment extraction unit 21 calculates edge intensity and a luminance gradient of each pixel by, for example, applying a Sobel filter to the grayscale image. The line segment extraction unit 21 thereafter extracts edge points by extracting pixels whose edge intensity values are larger than a prescribed value. The line segment extraction unit 21 communicates edge information relating to the extracted edge points to the improper region judging unit 22.

The improper region judging unit 22 judges, on the basis of the edge points extracted by the line segment extraction unit 21, presence/absence of an improper region where detection of a partition line to constitute a parking frame is difficult. For example, the improper region judging unit 22 determines, as an improper region, an unpaved road surface region (e.g., graveled region) or a grating region where more edge points are detected than in a paved road surface.

More specifically, the improper region judging unit 22 judges, as an improper region, a region where the density of edge points is higher than a prescribed value or the luminance gradient of edge points is not uniform. The improper region judging unit 22 eliminates edge information of the improper region from the above-mentioned edge information on the basis of the thus-determined improper region and gives resulting information to the downstream stage.

The partition line detection unit 23 detects partition line candidates, that is, candidates for partition lines to define a parking frame PS, on the basis of the edge lines extracted by the line segment extraction unit 21. More specifically, the partition line detection unit 23 detects, as a partition line candidate, two edge lines (each being a connection of plural consecutive edge points) that are approximately parallel with each other and whose interval corresponds to the width of a partition line.

That is, the partition line detection unit 23 detects, as a partition line candidate, two edge lines that correspond to left and right end lines of a partition line in its width direction. The partition line detection unit 23 generates partition line information relating to the detected partition line candidates and communicates the generated partition line information to the exception judging unit 24.

The partition line detection unit 23 can perform the processing of detecting partition line candidates in such a manner as to eliminate the improper region detected by the improper region judging unit 22. In other words, the partition line detection unit 23 does not perform the partition line candidate detection processing for the improper region. This makes it possible to reduce the processing load of the control unit 2.

The exception judging unit 24 judges presence/absence of a parking prohibition region where parking of the vehicle C is not permitted, on the basis of the partition line candidates detected by the partition line detection unit 23. For example, the exception judging unit 24 judges presence/absence of a parking prohibition region such as a zebra zone (vehicle guiding zone).

More specifically, where it is assumed that partition line candidates that approximately parallel with each other are partition lines (called "base partition lines"), the exception judging unit 24 judges that the region interposed between the base partition lines is a parking prohibition region (zebra zone) if three or more partition line candidates that are inclined with respect to the base partition lines exist at prescribed intervals.

The exception judging unit 24 may judge presence/absence of a partition line candidate(s) that is not necessary for detection of a parking frame PS, such as (part of) a road surface marking. For example, the exception judging unit 24 may detect a road surface marking contained in image data by matching partition line candidates detected by the partition line detection unit 23 with template models of road surface markings.

The exception judging unit 24 eliminates unnecessary partition line candidates from the partition line information, adds information indicating the parking prohibition region to the partition line information, and communicates the resulting partition line information to the parking frame detection unit 25.

The parking frame detection unit 25 detects a parking frame PS on the basis of the partition line candidates detected by the partition line detection unit 23. More specifically, the parking frame detection unit 25 detects, as partition lines, to be adjacent to the vehicle side surfaces, of a parking frame PS, two partition line candidates that are arranged parallel with each other with a prescribed interval.

The prescribed interval is a width of a standard parking region for common or public use that is prescribed in, for example, a law relating to parking lots. At this time, the parking frame detection unit 25 detects a parking frame PS so as to exclude the parking prohibition region determined by the exception judging unit 24.

That is, the parking frame detection unit 25 detects a parking frame PS so as to exclude a zebra zone or the like. Upon detecting the parking frame PS, the parking frame detection unit 25 communicates parking frame information relating to the detected parking frame PS to the parking frame managing unit 26. In the following, the partition line candidates detected as constituting a parking frame PS will be referred to as "partition lines." Each piece of partition line information includes apex coordinates of each partition line with reference to the vehicle C.

The parking frame managing unit 26 manages, in time series, pieces of partition frame information of the parking frame PS detected by the parking frame detection unit 25. The parking frame managing unit 26 can estimate a movement distance of the vehicle C on the basis of sensor values received from the sensor group Sc and estimate current apex coordinates of each partition line on the basis of the movement distance and past partition frame information.

Furthermore, the parking frame managing unit 26 can update the coordinate information of each partition line of past partition frame information on the basis of newly received partition frame information. That is, the parking frame managing unit 26 updates the relative positional relationship between the vehicle C and the parking frame PS at such occasions as the vehicle C moves.

Still further, it is also possible for the parking frame managing unit 26 to set a parking frame detection range with an assumption that plural parking frames PS are arranged continuously. For example, the parking frame managing unit 26 assumes that plural parking frames exist continuously including one parking frame PS (reference parking frame) detected by the parking frame detection unit 25.

And the parking frame managing unit 26 sets the thus-assumed range of the plural parking frames PS as a detection range. With this measure, it suffices for the above-described line segment extraction unit 21 to perform edge line detection processing only for the detection range set by the parking frame managing unit 26, whereby the processing load of the control unit 2 can be reduced.

The stop position determining unit 27 determines a stop position of the vehicle C, that is, a parking position in the parking frame PS, on the basis of the edge points detected by the line segment extraction unit 21. The stop position determining unit 27 will be described later with reference to FIG. 5.

The storage unit 3 corresponds to the RAM or HDD, which can store various kinds of information and information of various programs. The image processing device 1 may acquire those programs and various kinds of information via another computer connected to it over a wired or wireless network or via a portable recording medium.

The storage unit 3 is stored with weight parameter information 31. The weight parameter information 31 is information indicating the weight parameters to be used in the above-described weighted addition. More specifically, the weight parameters are used in processing of calculating a weighted sum of first target parking position P1 included in first target parking frame information and second target parking position P2 included in second target parking frame information.

Figure 3:
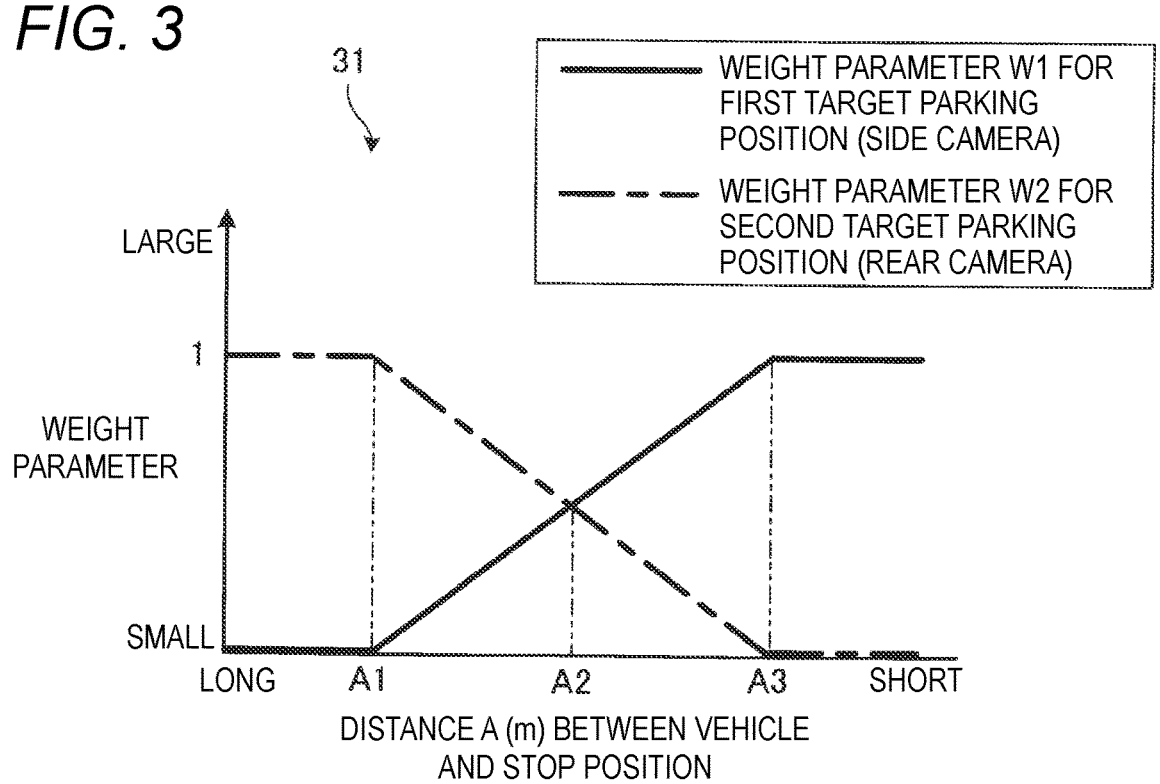
FIG. 3 is a graph how weight parameters included vary.
Figure 4:
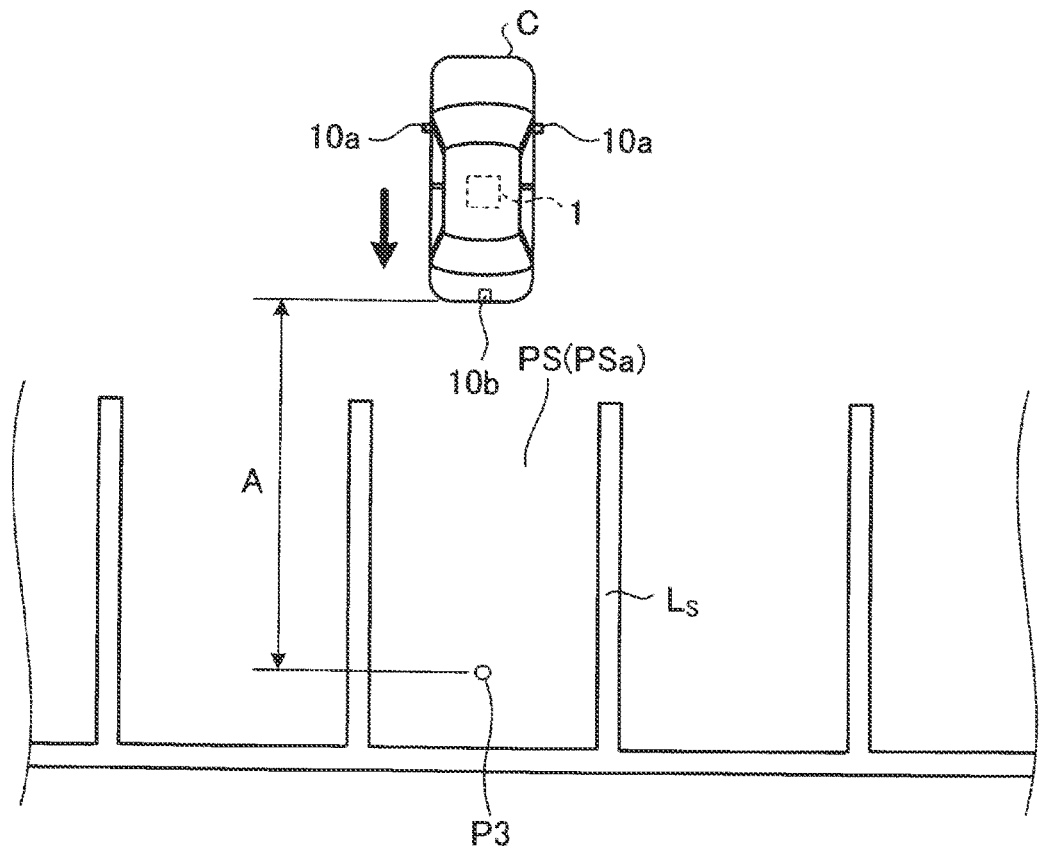
FIG. 4 is a diagram illustrating a distance between a vehicle and a target parking position.

The weight parameter information 31 will be described below with reference to FIGS. 3 and 4. FIG. 3 is a graph how weight parameters W1 and W2 included in the weight parameter information 31 vary. FIG. 4 is a diagram illustrating a distance between the vehicle C and a target parking position.

As shown in FIG. 3, the weight parameters W1 and W2 included in the weight parameter information 31 are set so as to vary according to the distance A between the vehicle C and a target parking position.

As shown in FIG. 4, the distance A is a distance between the vehicle C and a target parking position, that is, a stop position (in this example, third target parking position P3) in a target parking frame PSa. Thus, when autonomous parking is performed to park the vehicle C in a target parking frame PSa, the vehicle C comes closer to the target parking position P3 of the target parking frame PSa and hence the distance A becomes shorter gradually. That is, in the graph shown in FIG. 3, the distance A becomes shorter as the autonomous parking in the target parking frame PSa proceeds.

Although in the example shown in FIG. 4 the distance A is a distance from the rear end surface of the vehicle C to a target parking position, the embodiment is not limited to this case. For example, the distance A may be a distance from a portion, closest to a target parking position, of the vehicle C to the target parking position or a distance from the center of gravity of the vehicle C to the target parking position.

As shown in FIG. 3, the weight parameter W1 for the first target parking position P1 determined on the basis of an image taken by the side camera 10a is set so as to increase as the distance A becomes shorter. When the distance A is long, the parking frame PS occupies an end portion of an image taken by the side camera 10a. Where the lens of the side camera 10a is a wide-angle lens, distortion is prone to occur in an end portion of an image taken by the side camera 10a. In view of this, the weight parameter W1 corresponding to the side camera 10a is set so as to be small when the distance A is long and to increase as the distance A becomes shorter.

More specifically, the weight parameter W1 for the first target parking position P1 is set equal to 0 when the distance A is longer than a first prescribed distance A1 and is increased gradually from 0 as the distance A decreases from the first prescribed distance A1. The weight parameter W1 is set so as to become equal to the weight parameter W2 for the second target parking position P2 when the distance A is equal to a second prescribed distance A2 that is shorter than the first prescribed distance A1, and to become equal to 1 when the distance A is equal to a third prescribed distance A3 that is shorter than the second prescribed distance A2.

The weight parameter W2 for the second target parking position P2 determined on the basis of an image taken by the rear camera 10b is set so as to decrease as the distance A becomes shorter. When the distance A is short, the parking frame PS occupies an end portion of an image taken by the rear camera 10b. Where the lens of the rear camera 10b is a wide-angle lens, distortion is prone to occur in an end portion of an image taken by the rear camera 10b. In view of this, the weight parameter W2 corresponding to the rear camera 10b is set so as to be large when the distance A is long and to decrease as the distance A becomes shorter.

More specifically, the weight parameter W2 for the second target parking position P2 is set equal to 1 when the distance A is longer than the first prescribed distance A1 and is decreased gradually from 1 as the distance A decreases from the first prescribed distance A1. The weight parameter W2 is set so as to become equal to 0 when the distance A is equal to the third prescribed distance A3. Although in this example the third prescribed distance A3 is set at such a position that occurs immediately before the rear end the vehicle C enters the parking frame PS, the embodiment is not limited to this case.

Figure 5:
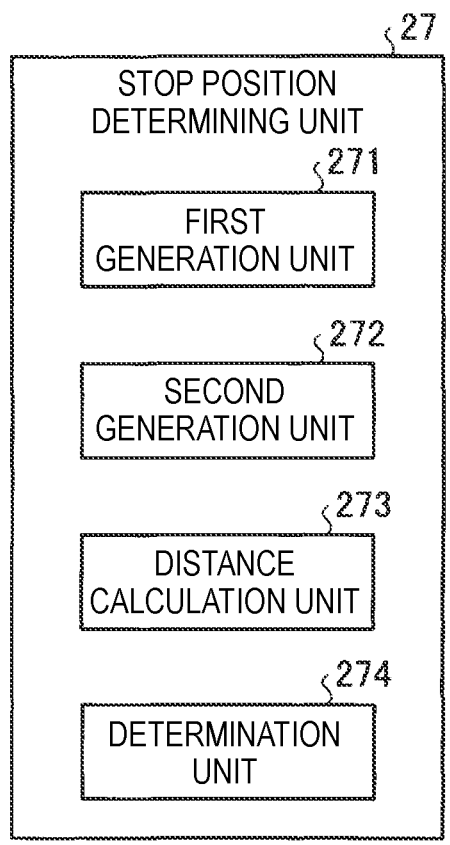
FIG. 5 is a functional block diagram showing the configuration of a stop position determining unit.

Next, a process executed by the stop position determining unit 27 will be described in detail with reference to FIG. 5. FIG. 5 is a functional block diagram showing the configuration of the stop position determining unit 27. As shown in FIG. 5, the stop position determining unit 27 is equipped with a first generation unit 271, a second generation unit 272, a distance calculation unit 273, and a determination unit 274.

The first generation unit 271 generates first target parking frame information on the basis of an image taken by the side camera 10a. The second generation unit 272 generates second parking frame information on the basis of an image taken by the rear camera 10b. For example, where autonomous parking is performed by moving the vehicle C forward, the second generation unit 272 may generate second target parking frame information on the basis of an image taken by the front camera 10c.

The first target parking frame information includes information indicating the first target parking position P1 and the second target parking frame information includes information indicating the second target parking position P2.

The distance calculation unit 273 calculates a distance between the vehicle C and a stop position (target parking position). For example, the distance calculation unit 273 calculates a distance in current processing by adding or subtracting a movement distance to or from a distance obtained by preceding processing. This method by which the distance calculation unit 273 calculates a distance is just an example and the embodiment is not limited to it.

The determination unit 274 and generates third target parking frame information as a stop target on the basis of the first target parking frame information and the second target parking frame information and thereby determines a stop position in the target parking frame PSa. The third target parking frame information includes information indicating third target parking position P3 that is a target stop position of the vehicle C being subjected to the autonomous parking.

As described above, the phenomenon that the target parking position (in this example, third target parking position P3) of the vehicle C changes suddenly to a large extent can be prevented by using both of the first target parking frame information and the second target parking frame information.

For example, the determination unit 274 determines a stop position in the target parking frame PSa by generating third target parking frame information (in this example, third target parking position P3) by calculating a weighted sum of the first target parking position P1 included in the first target parking frame information (an example of the first prescribed value) and the second target parking position P2 included in the second target parking frame information (an example of the second prescribed value).

More specifically, the determination unit 274 calculates a third target parking position P3 according to the following Equation (1):

(Third target parking position $P3$)=(first target parking position $P1$)×(weight parameter $W1$ for first target parking position $P1$)+(second target parking position $P2$)×(weight parameter $W2$ for second target parking position $P2$)    (1)

where (weight parameter $W1$)+(weight parameter $W2$)=1.

That is, as shown in FIG. 3, the determination unit 274 calculates a weighted sum of the first target parking position P1 and the second target parking position P2 using the weight parameters W1 and W2 that vary depending on the distance A calculated by the distance calculation unit 273.

The target parking position of the vehicle C is prone to change suddenly to a large extent with respect to the distance A. As described above, this phenomenon can be prevented effectively by using the weight parameters W1 and W2 that vary depending on the distance A.

For example, as shown in FIG. 3, the determination unit 274 increases the weight parameter W1 for the first target parking position P1 determined on the basis of an image taken by the side camera 10a as the distance A becomes shorter.

In other words, as shown in FIG. 3, the determination unit 274 decreases the weight parameter W2 for the second target parking position P2 determined on the basis of an image taken by the rear camera 10b as the distance A becomes shorter.

With this measure, a target parking position can be calculated accurately. As the distance A becomes shorter, the parking frame PS comes to occupy a larger area of an image taken by the side camera 10a to increase the reliability of the first target parking position P1 but the parking frame PS comes to occupy a smaller area or an end portion of an image taken by the rear camera 10b to lower the reliability of the second target parking position P2. A target parking position can be calculated accurately by setting the weight parameters in this manner.

Figure 6:
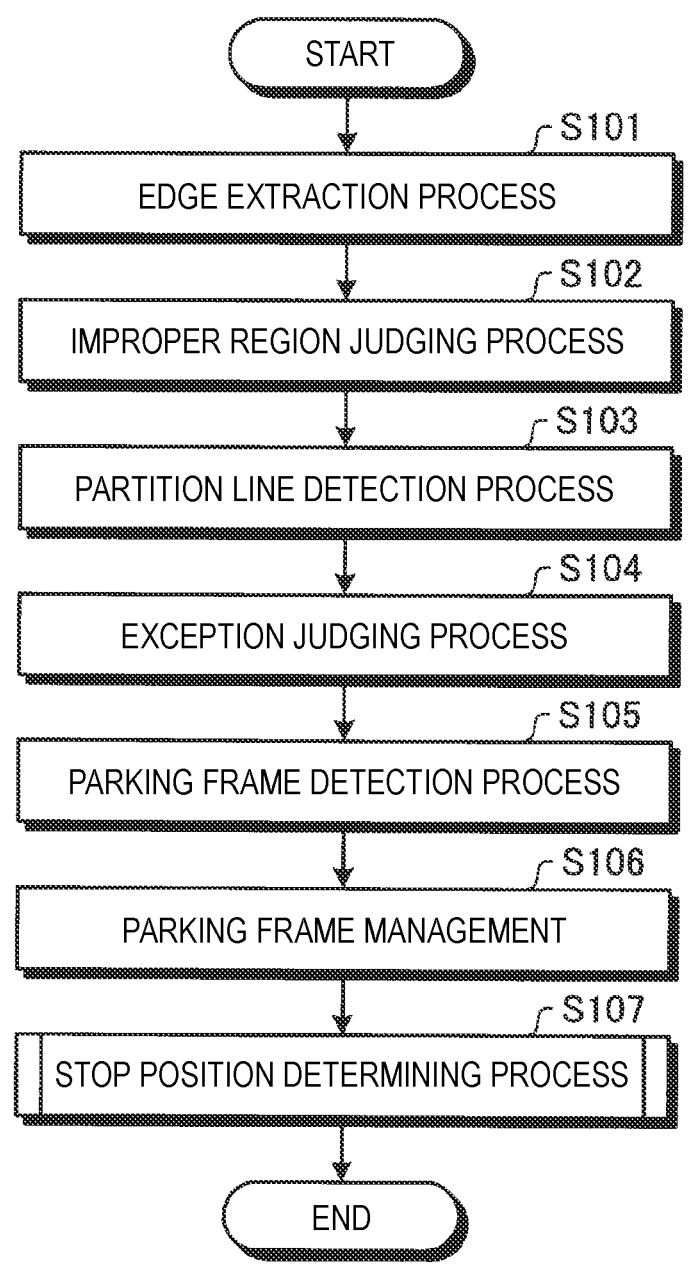
FIG. 6 is a flowchart showing the procedure of an overall process executed by the image processing device according to the embodiment.

The procedure of a process that is executed by the image processing device 1 according to the embodiment will be described with reference to FIGS. 6 and 7. FIG. 6 is a flowchart showing the procedure of an overall process executed by the image processing device 1. For example, this process is executed repeatedly by the control unit 2 while the vehicle speed of the vehicle C is lower than or equal to a prescribed value (e.g., 30 km/h).

As shown in FIG. 6, first, at step S101, the image processing device 1 executes an edge extraction process of extracting edge points from a grayscale image. At step S102, the image processing device 1 executes an improper region judging process on the basis of processing results of the edge extraction process.

At step S103, the image processing device 1 executes a partition line detection process of detecting partition line candidates on the basis of the edge points extracted at step S101.

At step S104, the image processing device 1 executes an exception judging process of judging presence/absence of a parking prohibition region or the like on the basis of the processing results of steps S101-S103. At step S105, the image processing device 1 executes a parking frame detection process of detecting a parking frame PS.

At step S106, the image processing device 1 performs parking frame management of managing the parking frame PS detected at step S105. At step S107, the image processing device 1 executes a stop position determining process of determining a stop position, where to stop the vehicle C, in the parking frame PS. Then the image processing device 1 finishes the execution of the process shown in FIG. 6.

Next, the procedure of the stop position determining process will be described in detail. FIG. 7 is a flowchart of the stop position determining process which is executed by the image processing device 1.

Figure 7:
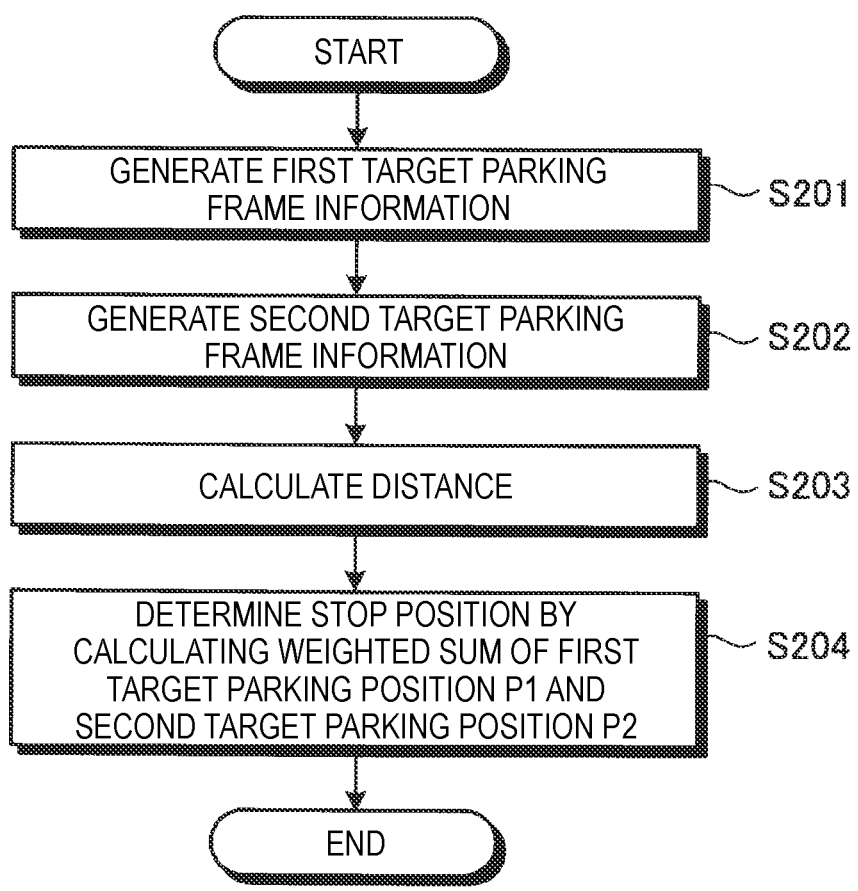
FIG. 7 is a flowchart of a stop position determining process executed by the image processing device according to the embodiment.

Referring to FIG. 7, at step S201, the stop position determining unit 27 generates first target parking frame information on the basis of an image taken by one of the side cameras 10a. At step S202, the stop position determining unit 27 generates second target parking frame information on the basis of an image taken by the rear camera 10b.

Although in the above example the second target parking frame information is generated after the generation of first target parking frame information, first target parking frame information may be generated after generation of second target parking frame information. As a further alternative, first target parking frame information and second target parking frame information may be generated with the same timing.

At step S203, the stop position determining unit 27 calculates a distance A between the vehicle C and a stop position (target parking position). At step S204, the stop position determining unit 27 determines a stop position in the target parking frame PSa by generating third target parking frame information (third target parking position P3) by calculating a weighted sum of the first target parking position P1 and the second target parking position P2 using the weight parameters W1 and W2 that depend on the distance A.

As described above, the image processing device according to the embodiment is equipped with the first generation unit 271, the second generation unit 272, and the determination unit 274. The first generation unit 271 generates first target parking frame information on the basis of an image taken by a first shooting unit (side camera 10a) that is installed at a side position of a vehicle C. The second generation unit 272 generates second target parking frame information on the basis of an image taken by a second shooting unit (front camera 10c or rear camera 10b) that is installed at a front or rear position of the vehicle C. The determination unit 274 determines a stop position in a parking frame by generating third target parking frame information to serve as a stop target on the basis of the first target parking frame information generated by the first generation unit 271 and the second target parking frame information generated by the second generation unit 272. With this configuration, a sudden change of the target parking position can be prevented.

Although in the above embodiment a weighted sum of the first target parking position P1 and the second target parking position P2 is calculated, the invention is not limited to this case. For example, a stop position may be determined by calculating weighted sums of the end points Q (see FIG. 1) of the target parking frame PSa included in the first target parking frame information and the end points Q of the target parking frame PSa included in the second target parking frame information and generating third target parking frame information (third target parking position P3) on the basis of the end points Q calculated by the weighted addition.

Those skilled in the art can easily derive further advantages and modifications. Thus, broader modes of the invention are not limited to the particular and typical detailed embodiment expressed and described above. That is, various modifications are possible without departing from the comprehensive spirit and scope of the invention that are defined by the attached claims and their equivalents.

LIST OF REFERENCE SYMBOLS

1: Image processing device
10a: side camera
10b: Rear camera
10c: Front camera
271: First generation unit
272: Second generation unit
273: Distance calculation unit
274: Determination unit
C: Vehicle

What is claimed is:

1. An image processing device comprising:
a hardware processor configured to:
generate first target parking frame information based on an image taken by a first camera that is provided at a side position of a vehicle, the first target parking frame information including a first prescribed value of a specific position that is a part of a parking frame;
generate second target parking frame information based on an image taken by a second camera that is provided at a front position or a rear position of the vehicle, the second target parking frame information including a second prescribed value of the specific position that is a part of the parking frame; and
determine a stop position in the parking frame by generating third target parking frame information to serve as a stop target based on the first target parking frame information that has been generated and the second target parking frame information that has been generated.

2. The image processing device according to claim 1, wherein the hardware processor determines the stop position by generating the third target parking frame information by calculating a weighted sum of: (i) the first prescribed value and (ii) the second prescribed value.

3. The image processing device according to claim 2, wherein the hardware processor is further configured to calculate a distance between the vehicle and the stop position, and
wherein the hardware processor calculates the weighted sum of the first prescribed value and the second prescribed value using a weight parameter that depends on the distance that has been calculated between the vehicle and the stop position.

4. The image processing device according to claim 3, wherein the hardware processor increases the weight parameter for the first prescribed value as the distance that has been calculated between the vehicle and the stop position becomes shorter.

5. The image processing device according to claim 2, wherein:
the first prescribed value is a first target parking position that is calculated based on the image taken by the first camera; and
the second prescribed value is a second target parking position that is calculated based on the image taken by the second camera.

6. The image processing device according to claim 3, wherein:
the first prescribed value is a first target parking position that is calculated based on the image taken by the first camera; and
the second prescribed value is a second target parking position that is calculated based on the image taken by the second camera.

7. The image processing device according to claim 4, wherein:
the first prescribed value is a first target parking position that is calculated based on the image taken by the first camera; and
the second prescribed value is a second target parking position that is calculated based on the image taken by the second camera.

8. An image processing method performed by a hardware processor and comprising:
generating first target parking frame information based on an image taken by a first camera that is provided at a side position of a vehicle, the first target parking frame information including a first prescribed value of a specific position that is a part of a parking frame;
generating second target parking frame information based on an image taken by a second camera that is provided at a front position or a rear position of the vehicle, the second target parking frame information including a second prescribed value of the specific position that is a part of the parking frame; and
determining a stop position in the parking frame by generating third target parking frame information to serve as a stop target based on the generated first target parking frame information and the generated second target parking frame information.

9. The image processing method according to claim 8, wherein the stop position is determined by generating the third target parking frame information by calculating a weighted sum of: (i) the first prescribed value and (ii) the second prescribed value.

10. The image processing method according to claim 9, further comprising:
calculating a distance between the vehicle and the stop position,
wherein the weighted sum of the first prescribed value and the second prescribed value is calculated using a weight parameter that depends on the distance that has been calculated between the vehicle and the stop position.

11. The image processing method according to claim 10, wherein the weight parameter for the first prescribed value is increased as the distance that has been calculated between the vehicle and the stop position becomes shorter.

12. The image processing method according to claim 9, wherein:
the first prescribed value is a first target parking position that is calculated based on the image taken by the first camera; and
the second prescribed value is a second target parking position that is calculated based on the image taken by the second camera.

13. The image processing method according to claim 10, wherein:
the first prescribed value is a first target parking position that is calculated based on the image taken by the first camera; and
the second prescribed value is a second target parking position that is calculated based on the image taken by the second camera.

14. The image processing method according to claim 11, wherein:
the first prescribed value is a first target parking position that is calculated based on the image taken by the first camera; and
the second prescribed value is a second target parking position that is calculated based on the image taken by the second camera.

* * * * *